No. 711,503. Patented Oct. 21, 1902.
J. P. JACKSON.
SCISSORS OR SHEARS.
(Application filed Nov. 22, 1901.)

(No Model.)

Witnesses
J. H. Shumway
Clara L. Weed.

Joseph P. Jackson,
Inventor
By Attys Seymour & Earle

UNITED STATES PATENT OFFICE.

JOSEPH P. JACKSON, OF SOUTHINGTON, CONNECTICUT.

SCISSORS OR SHEARS.

SPECIFICATION forming part of Letters Patent No. 711,503, dated October 21, 1902.

Application filed November 22, 1901. Serial No. 83,219. (No model.)

*To all whom it may concern:*

Be it known that I, JOSEPH P. JACKSON, of Southington, in the county of Hartford and State of Connecticut, have invented a new and useful Improvement in Scissors and Shears; and I do hereby declare the following, when taken in connection with the accompanying drawings and the letters of reference marked thereon, to be a full, clear, and exact description of the same, and which said drawings constitute part of this specification, and represent, in—

Figure 1:
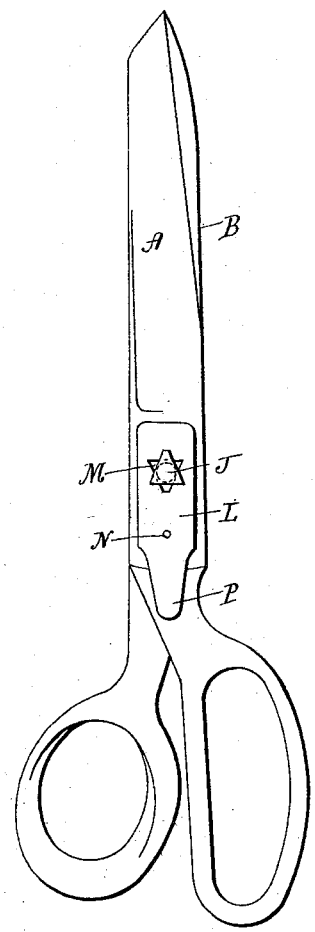
Figure 2:
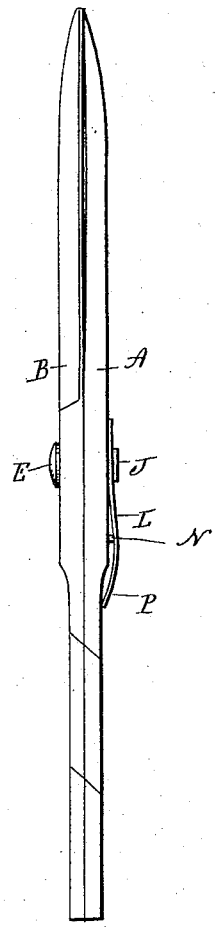
Figure 3:
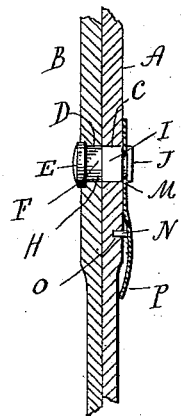
Figure 4:
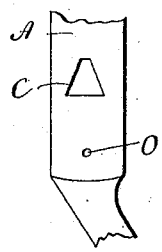
Figure 5:
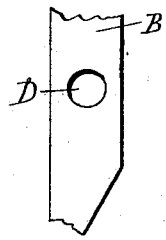
Figure 6:
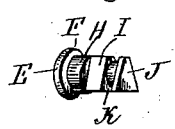
Figure 7:
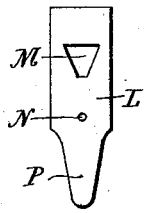

Figure 1, a side view of a pair of shears constructed in accordance with my invention; Fig. 2, an edge view of the same; Fig. 3, a vertical central section through the central portion of the members and locking device; Fig. 4, a face or plan view of the central portion of one of the blades having an angular rivet-opening; Fig. 5, a similar view of the other blade having a round opening; Fig. 6, a perspective view of the rivet detached; Fig. 7, a plan view of the key.

This invention relates to an improvement in scissors and shears, and particularly to that class in which a key is employed to hold the rivet in position and avoid the screw-rivet which is more generally employed, the object being a simple arrangement whereby the key will be positively held in position and also a construction in which a portion of the rivet is angular for engagement with an angular opening in one of the blades; and the invention consists in the construction as hereinafter described, and particularly recited in the claim.

The members A B of the scissors or shears are of the usual form and may be slightly bowed longitudinally, as shown in Fig. 2. One member A is provided with an angular rivet-hole C, and the other member B is provided with a round rivet-hole D. The hole in the member B may be enlarged at its outer end to form a recess for the head E of the rivet F in the usual manner. With the members thus formed the rivet F is adapted to pass through the two members and project beyond the outer face of the member A. This rivet comprises a round portion H, corresponding to the hole D in the member B, an angular portion I corresponding to the angular hole C in the member A, and a triangular end J, beneath which is an angular groove K. This rivet is passed through the two members and so that the end J projects beyond the face of the member A, and to hold the rivet in position I employ a locking-key L, having the triangular opening M, corresponding to the triangular end J of the rivet over which the key may pass, the apex of the triangle in the key being reversed in position to the apex of the triangle on the rivet and so that the key must be turned out of line with its locked position in order to be passed over the rivet. When the key is passed over the end of the rivet, it is turned in the groove K, so as to reverse the position of the angles, whereby the key becomes interlocked with the rivet, as clearly shown in Fig. 1.

To hold the key in its locked position, I preferably provide it with a small stud or pin N, projecting from its inner face into a hole or notch O in the face of the member A, the lower end of the key being contracted to form a finger-piece P. This key is longitudinally bowed, as shown in Fig. 2, to permit the members to be slightly forced apart.

I am aware that scissors and shears have been connected by a rivet extending through them and projecting beyond the face of one of the members, and a key coacting with said projecting end of the rivet for locking the same in position and uniting the two members. I am also aware that rivets for scissors and shears have been made with an angular portion and a round portion, and therefore do not wish to be understood as claiming, broadly, such as my invention.

Having fully described my invention, what I claim as new, and desire to secure by Letters Patent, is—

The herein-described scissors and shears comprising two blades, one having a round rivet-hole and the other an angular rivet-hole, a rivet adapted to be passed through the rivet-holes in the blades, said rivet having an angular portion and a round portion corresponding to the holes in the blades, one end of the rivet projecting beyond the face of one of the blades and made triangular, an annular groove below said triangular end and a key having a triangular opening corresponding to the triangular projecting end of the rivet over which it is adapted to set, the apex of the triangle in the key being reversed in position to the apex of the triangle of the rivet when the key is in its locked position, whereby the key must be turned out of line with the locked position before it can be set over the rivet, said key formed with a finger-piece at its inner end and also provided with a small stud or pin projecting from its inner face and adapted to enter a notch formed in the outer face of the member adjacent thereto, substantially as described.

In testimony whereof I have signed this specification in the presence of two subscribing witnesses.

JOSEPH P. JACKSON.

Witnesses:
EDWIN G. LEWIS,
ROY P. NEWELL.